(12) United States Patent
Davis et al.

(10) Patent No.: US 8,897,745 B2
(45) Date of Patent: Nov. 25, 2014

(54) METHOD AND APPARATUS FOR OPTIMIZING DELIVERY OF NETWORK USAGE AND BILLING DATA

(71) Applicants: Andrew T. Davis, North Bend, WA (US); Thomas P. Paull, Seattle, WA (US); Edward V. Goldbloom, Redmond, WA (US)

(72) Inventors: Andrew T. Davis, North Bend, WA (US); Thomas P. Paull, Seattle, WA (US); Edward V. Goldbloom, Redmond, WA (US)

(73) Assignee: Cellco Partnership, Basking Ridge, NJ (US)

( * ) Notice: Subject to any disclaimer, the term of this patent is extended or adjusted under 35 U.S.C. 154(b) by 167 days.

(21) Appl. No.: 13/713,690

(22) Filed: Dec. 13, 2012

(65) Prior Publication Data

US 2014/0171021 A1    Jun. 19, 2014

(51) Int. Cl.
*H04M 11/00* (2006.01)
*H04W 4/26* (2009.01)

(52) U.S. Cl.
CPC .................................. *H04W 4/26* (2013.01)
USPC .......................................... 455/405; 455/560

(58) Field of Classification Search
CPC ..................... H04M 2215/32; H04M 2215/22; H04M 15/00; H04M 2215/2026; H04M 17/00; H04W 4/24; H04W 4/26
USPC .................................................. 455/405–409
See application file for complete search history.

(56) References Cited

U.S. PATENT DOCUMENTS

| | | | |
|---|---|---|---|
| 8,218,742 B2 * | 7/2012 | Cai et al. ........................ | 379/126 |
| 2004/0161084 A1 * | 8/2004 | Lampell et al. ................ | 379/111 |

\* cited by examiner

*Primary Examiner* — Vladimir Magloire

(57) ABSTRACT

An approach for optimizing the rate of delivery of data records required by a billing system associated with a service provider is described. A mediation platform collects session records for specifying data about sessions conducted by network subscribers via the network and transport records for specifying data about the transport of data via the network during a correlation cycle. The mediation platform also generates, based on a minimal threshold of correlation, a charging data record based on a mapping of data associated with a session record and multiple transport records. The mediation platform also transmits the charging data record to a billing system of the provider prior to the collecting of all of the session records and transport records.

20 Claims, 9 Drawing Sheets

100

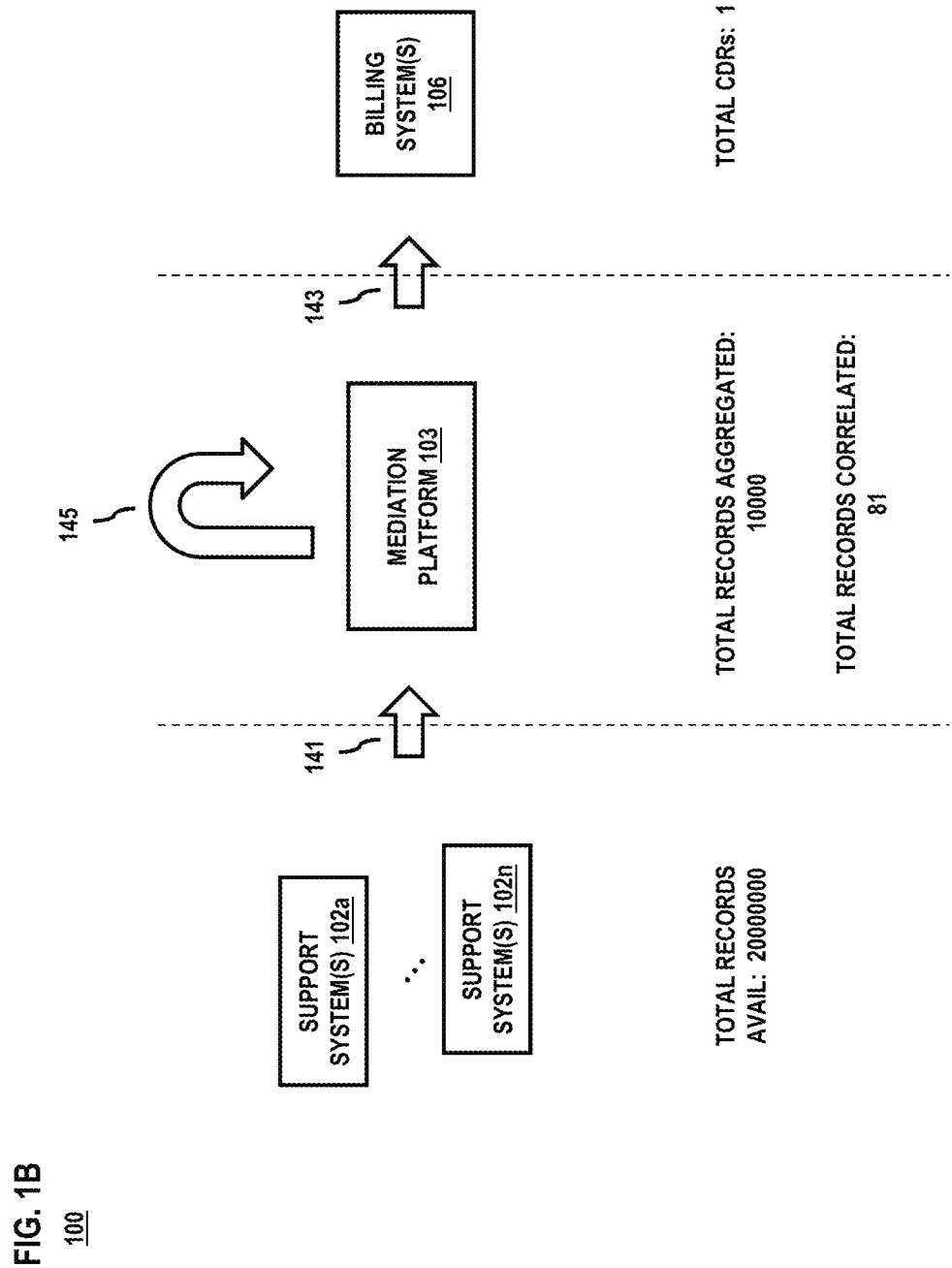

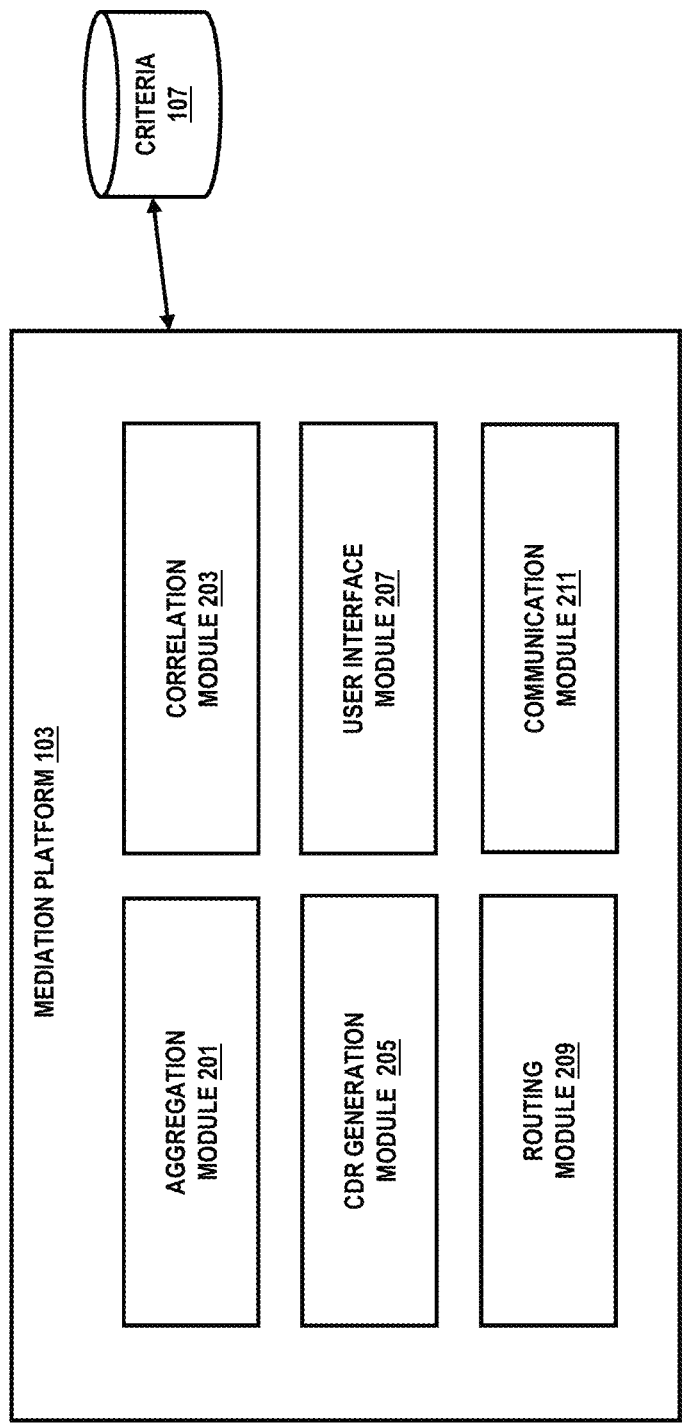

FIG. 3B
308

 START

309 ANALYZE THE SESSION RECORDS AS COLLECTED TO DETERMINE A NUMBER OF THE SESSION RECORDS THAT CORRESPOND TO A PREDETERMINED SESSION TYPE, TRANSACTION TYPE, SERVICE TYPE OR SUBSCRIBER TYPE

311 GENERATE, BASED ON THE ANALYSIS, CHARGING DATA RECORDS BASED ON A MAPPING OF DATA ASSOCIATED WITH THE SESSION RECORDS

 END

FIG. 3A
300

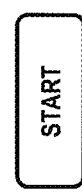 START

301 COLLECT SESSION RECORDS FOR SPECIFYING DATA ABOUT SESSIONS CONDUCTED BY NETWORK SUBSCRIBERS VIA THE NETWORK AND TRANSPORT RECORDS FOR SPECIFYING DATA ABOUT THE TRANSPORT OF DATA VIA THE NETWORK DURING A CORRELATION CYCLE

303 DETERMINE, BASED ON CORRELATION CRITERIA, A MINIMAL THRESHOLD OF CORRELATION BETWEEN ONE OF THE SESSION RECORDS AND MULTIPLE TRANSPORT RECORDS

305 GENERATE, BASED ON THE MINIMAL THRESHOLD OF CORRELATION, A CHARGING DATA RECORD BASED ON A MAPPING OF DATA ASSOCIATED WITH THE ONE SESSION RECORD AND THE MULTIPLE TRANSPORT RECORDS

307 TRANSMIT THE CHARGING DATA RECORD TO A BILLING SYSTEM OF THE PROVIDER PRIOR TO THE COLLECTING OF ALL THE SESSION RECORDS AND THE TRANSPORT RECORDS

 END

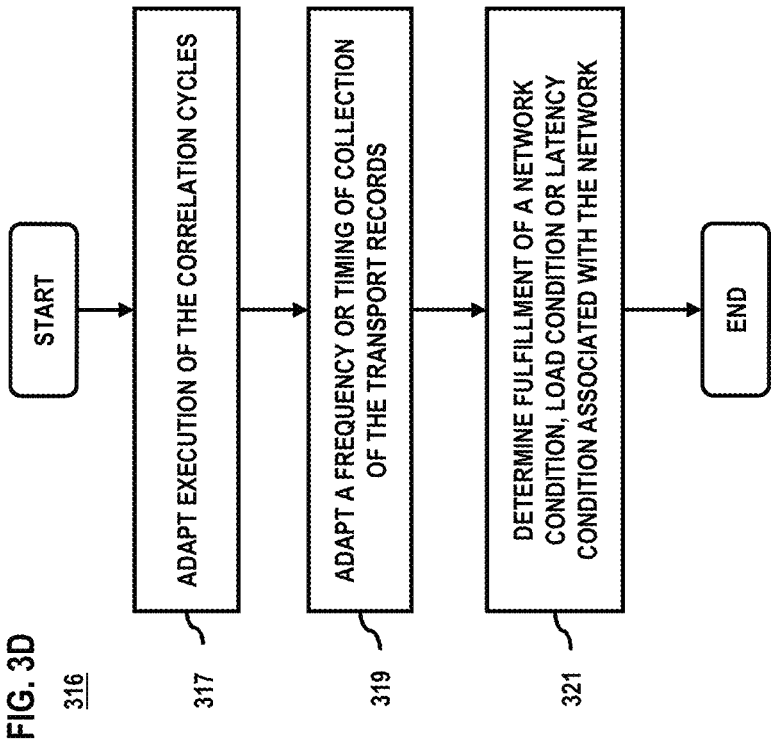

FIG. 3D
316
317 — ADAPT EXECUTION OF THE CORRELATION CYCLES
319 — ADAPT A FREQUENCY OR TIMING OF COLLECTION OF THE TRANSPORT RECORDS
321 — DETERMINE FULFILLMENT OF A NETWORK CONDITION, LOAD CONDITION OR LATENCY CONDITION ASSOCIATED WITH THE NETWORK

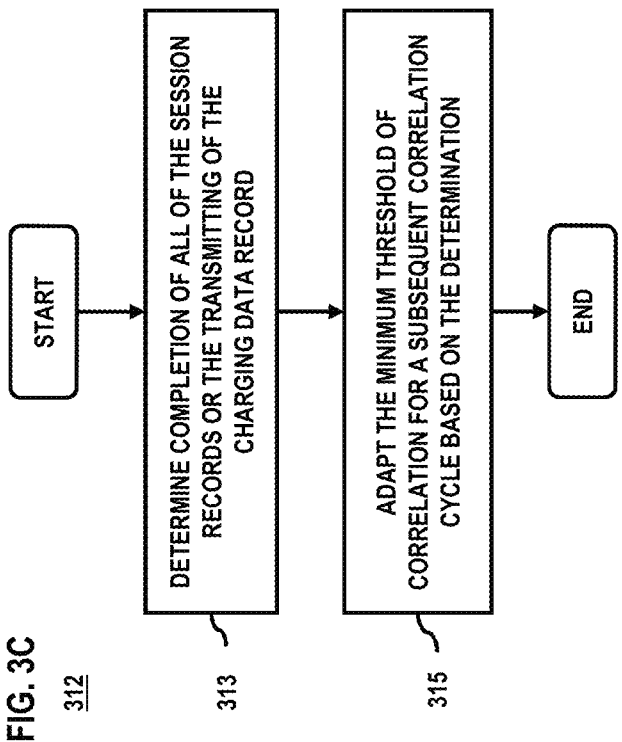

FIG. 3C
312
313 — DETERMINE COMPLETION OF ALL OF THE SESSION RECORDS OR THE TRANSMITTING OF THE CHARGING DATA RECORD
315 — ADAPT THE MINIMUM THRESHOLD OF CORRELATION FOR A SUBSEQUENT CORRELATION CYCLE BASED ON THE DETERMINATION

322

METHOD AND APPARATUS FOR OPTIMIZING DELIVERY OF NETWORK USAGE AND BILLING DATA

BACKGROUND INFORMATION

Typically, network providers collect data related to subscribers from different network elements configured to the service provider network. The records may contain information about billable network usage events, such as a time of call set-up, duration of a call, amount of data transferred during an internet session, etc; data which may be used to facilitate generation of billing requests to subscribers. Unfortunately, if the records for confirming network access do not correlate with records for confirming the amount and type of data transported via the network, the billing effort is delayed.

Based on the foregoing, there is a need for optimizing the rate of delivery of data records required by a billing system associated with a service provider.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 1B is a diagram depicting a flow of data through the system of FIG. 1A, according to one embodiment;

FIG. 2 is a diagram of a mediation platform, according to one embodiment;

FIGS. 3A-3E are flowcharts of processes for optimizing the rate of delivery of data records required by a billing system associated with a service provider, according to various embodiments;

DESCRIPTION OF THE PREFERRED EMBODIMENT

An apparatus, method and software for optimizing the rate of delivery of data records required by a billing system associated with a service provider is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1A:
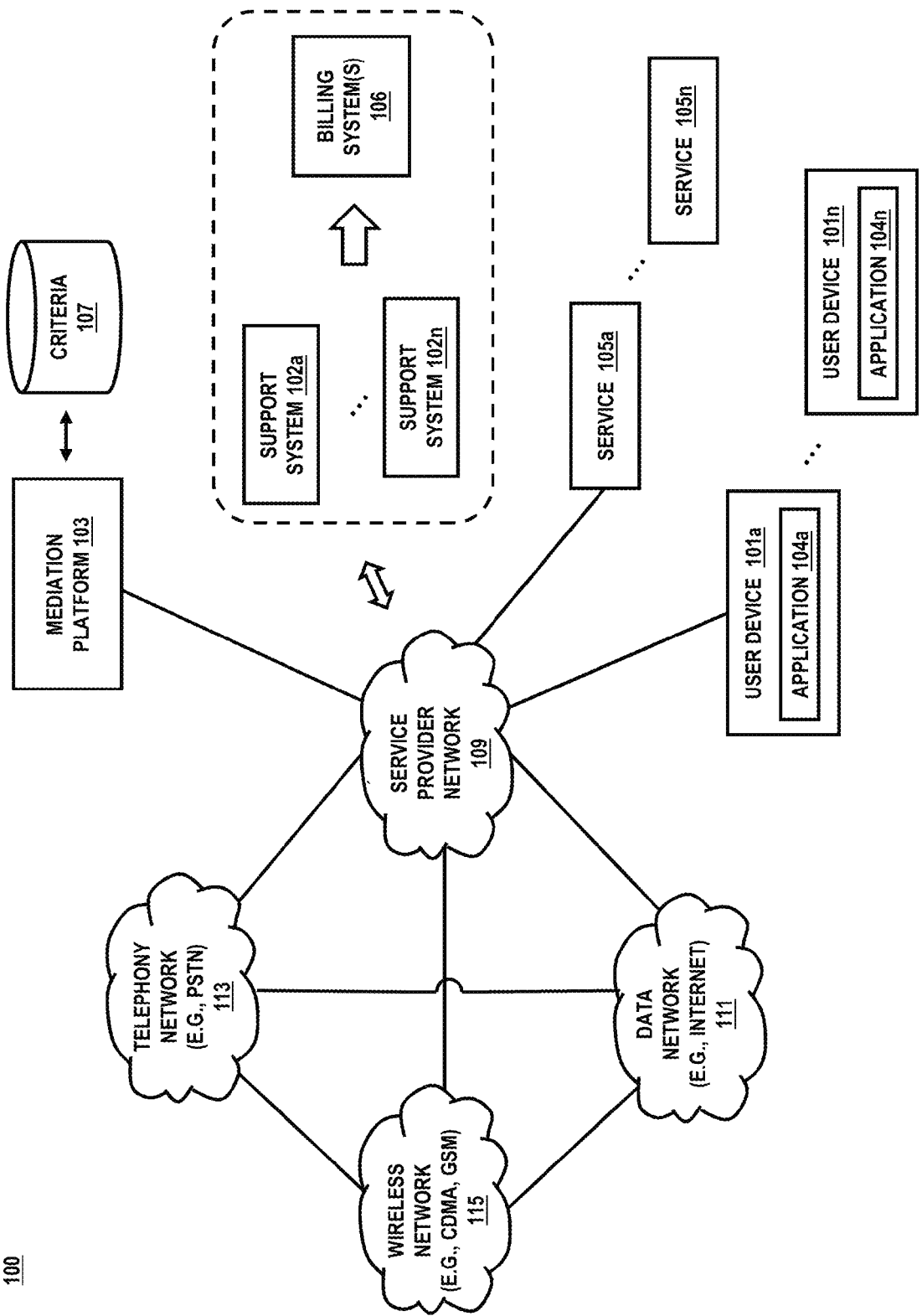
FIG. 1A is a diagram of a system for optimizing the rate of delivery of data records required by a billing system associated with a service provider, according to one embodiment.
Figure 3E:
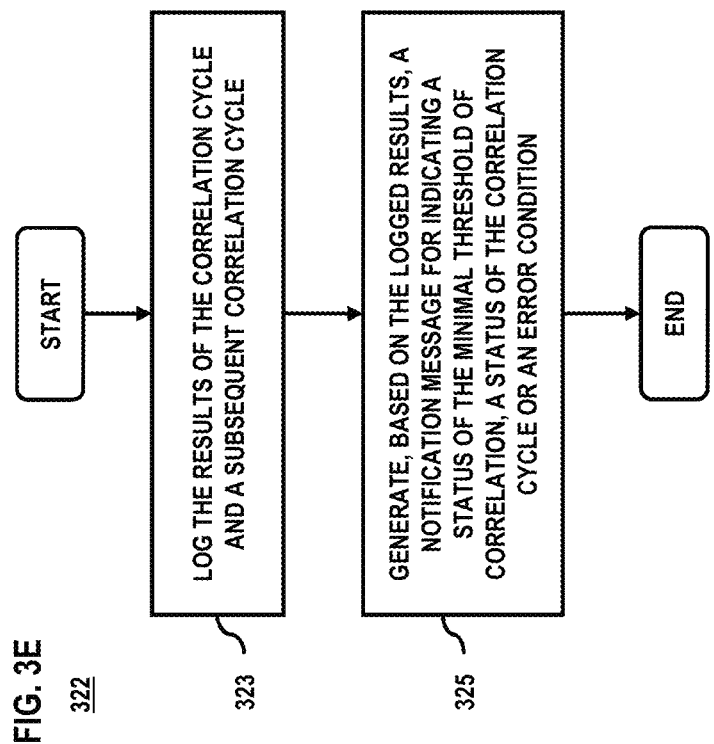

FIG. 1A is a diagram of system for optimizing the rate of delivery of data records required by a billing system associated with a service provider, according to one embodiment. For the purpose of explanation, system 100 is shown to include one or more user devices 101a-101n (e.g., mobile device, smart phone, netbook, laptop, set-top box, desktop computer or any communications enabled computing device). The user devices 101a-101n, referred to herein collectively as user devices 101, may belong to one or more users subscribed to the service provider network 109. As such, the user devices 101 may interact with one or more remote services 105a-105n (referred to herein as services 105) for performing various data processing tasks and for transferring or requesting data of various types. The services 105a-105n may be related to mobile communication services, e.g., cellular telephony, mobile data services, etc. The user devices 101 may also communicate with other devices to perform different data processing and networking tasks. From the perspective of a provider of the network 109, some of these tasks may constitute chargeable/billable events. Hence, the ability of providers to account for subscriber usage of their network as well as generate effective billing statements based on such usage is critical.

As noted previously, network providers typically collect data records related to subscribed users from numerous network elements configured to the service provider network. The network elements may include business operational support systems, operational support systems and other components that perform a multitude of functional tasks related to the network 109 and the subscribers. This includes, for example, systems for performing session management, subscriber management, network logistics, traffic management, etc; some of which are directly owned by the provider and others that are configured for operation within the service provider network 109 according to a business arrangement (owned by third party vendors). Thus, information may be periodically retrieved from these systems for accessing information about billable network usage events. This may include, for example, events such as a time of call set-up, call duration, amount of data transferred during an internet session, user/subscriber identifier data, etc. Based on this data, the network provider may then validate the type and duration of use of their network by subscribers and provide this data to a billing or usage system that facilitates generation of billing requests. Effective billing requires the records retrieved from the different support systems 102 be able to be reconciled and/or correlated properly.

Unfortunately, if the records for confirming network access (e.g., session records) do not correlate with records for confirming data transported via the network 109 (e.g., data transport records); the entire billing effort must be delayed. This delay can be several hours as the period of time for mere aggregation of the totality of records can be extensive. As such, the service provider has no choice but to wait until the support systems 102 that provide the records are available again so that they may perform another correlation; thus limiting the ability to efficiently generate billing statements on the availability of the corresponding.

To address this issue, system 100 presents a mediation platform 103 that is configured to operate in connection with business and/or operational support systems 102 of the network 109 to decrease the amount of time for delivery of critical usage data. By way of example, the mediation platform 103 facilitates execution of an expedited correlation procedure, wherein records gathered from the support systems 102 are analyzed against correlation criteria 107 to determine a minimum threshold of correlation of said records.

In certain embodiments, correlation is performed periodically, per a correlation cycle as initiated via the mediation platform 103. The periodicity may be defined by the network service provider or based upon an availability of the network elements (e.g., support systems 102) configured to provide data records for performing the correlation. Hence, the number of correlation cycles and the periodicity may be configured by the network provider. By way of example, a correlation cycle may include a procedure wherein the data records are requested and pulled from the myriad of support systems 102. The correlation cycle may also include tasks for aggregating and subsequently analyzing the records to determine if the records correlate to one another. Analysis of the data records is performed based on correlation criteria 107, which may include for example, rules for defining a condition, status or characteristic of traffic and/or data associated with a subscribed user device 101. The criteria may further define various network usage and interaction types of the subscriber via the network 109.

Based on the criteria 107, the mediation platform 103 may determine if a match exists between different data types, time information, data sizes, service types, session types, Internet Protocol (IP) addresses and other characteristics as featured in one type of data record versus another. In addition, the correlation may include means for reconciling or linking one type of data record associated with user interaction with the network (based on a common user, device or session identifier) against another data record associated with the delivery of data across the network. In certain embodiments, when the records are determined to fulfill at least a minimum threshold of correlation—the threshold being configurable by the network service provider—the mediation platform 103 facilitates generation of charging data records or call detail record (CDRs) based on the correlation.

In certain embodiments, the CDRs may be generated according to a standard internet telephony format, such as in the form of an internet protocol detail record (IPDR) or the like. Data encapsulated within the CDR include data elements as mapped from the data records captured from the support systems 102 during correlation. Hence, in the case of an internet, wireless or telephony communication action taken by a device 101, the CDR may include information regarding chargeable telecommunication events. This includes actions such as the placement of a phone call or accessing of the Internet via the user device 101. Data elements corresponding to this chargeable event as encapsulated in the IPDR formatted CDRs may include the time of call set-up, the duration of the call, the amount of data transferred, the IP address of the interacting nodes and the user device 101, the activation of the service, etc. It is noted that a separate CDR may be generated for each transaction or party to be charged.

The CDRs are then forwarded to one or more billing systems 106, which use the information regarding the chargeable events to generate billing statements pertaining to subscribers. In addition, the billing systems 106 may generate usage or service statements pertaining to the subscribers based on the information as gathered per the correlated records. While shown as a separate system, the billing system 106 may also be a business and/or operational support system 102 of the network service provider. Alternatively, the billing system 106 may be a downstream consumer billing system. Whether an internal or consumer tool, the billing system 106 may include any accounting, usage, billing management, revenue management or other tool for receiving usage information regarding the subscribed users. For the purpose of explanation, the billing system 106 is depicted as a separate downstream entity that receives the generated CRDs as input via the mediation platform 103.

In certain embodiments, the data records obtained from the support systems 102 during a correlation cycle may include, among other types of data, session records and transport records. For the purpose of illustration, the session records may include any data records for specifying details about one or more sessions initiated by the devices 101a-101n of subscribed users. A session may include a period of time of an established connection or channel between respective nodes via the network 109 for permitting the exchange of data. In the context of the service provider network 109, this may include sessions initiated between the user devices 101 and any other remote services. In addition, sessions may be established with other devices via the network 109. A session record may contain, for example, one or more of the following data as shown in Table 1 below:

TABLE 1

Inbound/outbound interface index value for specifying traffic/packet origination and destination details
Timestamps for indicating the start and stop time of a session
The number of bytes and packets observed during the session
IP header information:
    Source & destination IP addresses
    Source and destination port numbers for transmission control protocol (TCP), user datagram protocol (UDP) and/or stream control transmission protocol (SCTP)
    Internet control message protocol (ICMP) type and code.
    IP protocol
    Wireless application protocol (WAP)
    Type of Service (ToS) value
Routing information:
    IP address of the immediate next-hop along the route to the destination
    Source & destination IP masks (prefix lengths in the classless inter-domain routing (CIDR) notation)
Identifier information:
    User and device (source) identifier value corresponding to a session
    Destination identifier value corresponding to a session
    Calling application identifiers (e.g., as related to application 104a-104n that may be employed at respective user devices for invoking a session)
    Session identifiers and sequence values
    Correlation identifier (per AAA or FDR requirements)

In addition, the mediation platform 103 collects transport records from the different support systems 102. For the purpose of illustration, the transport records may include any data records for specifying details about the actual data transported over a network relative to a session. A transport record may contain, for example, one or more of the following data as shown in Table 2 below:

TABLE 2

Timestamps for indicating transmission of data (e.g., time of start, time of stop)
The number of bytes and packets transmitted (e.g., along with checksum information)
The data type and/or class
IP header information:
    Source & destination IP addresses
Routing information:
    IP address of the immediate next-hop along the route to the destination
Identifier information:
    User and device (source) identifier value corresponding to a session
    Destination identifier value corresponding to a session
    Calling application identifiers (e.g., as related to application 104a-104n that may be employed at respective user devices for invoking a session)
    Session identifiers and sequence values
    Correlation identifier (per AAA or FDR requirements)

It is noted that there is some redundancy between information specified in a session record and a transport record. Also, it is noted that a single session record may correspond to multiple transport records (e.g., a 1-to-many proportionality), while the multiple transport records may correspond to only one session record. This is reflective of distributed networking system architectures, wherein multiple packets/bytes or sets thereof corresponding to a single load may be transmitted during the course of single session.

In certain embodiments, as a result of the affinity between the session and transport records, the mediation platform 103 is able to determine a correlation between them on the basis of correlation criteria 107. The correlation criteria 107 may include, for example, a key identifier value (e.g., session identifier or user identifier), timestamp information and other parameters that are common to both sets of records. In the case of a match between records per the criteria 107, the mediation platform 103 flags this as a correlation of said records. In the case where there is no match between a given session record and one or more transport records, this indicates a non-correlation condition.

In addition to the matching, the correlation determination may also be based on a threshold of affinity between records. The threshold may correspond to a percentage, or subset, of the total number of transport records for a given session record being determined to correlate. The total number of records may be determined based on a comparison of the byte counts observed in the assembled transport records as collected for the same session record. By way of example, in the case of a session record that correlates to a total of 100 transport records (each individual transport record corresponding to a portion of the total bytes/packets for the session), a minimum threshold of, e.g., 90% enables correlation with only 90 of the transport records being identified/matched. Under this approach, the mediation platform 103 only needs to analyze a percentage/portion of the overall records to compute a correlation result as opposed to requiring the full set of all records to be gathered from the support systems 102. Furthermore, the minimum threshold value may be adapted by the network service provider accordingly to accommodate different billing and usage needs, system configurations, time constraints, contractual/service obligations or other business factors.

In certain embodiments, the mediation platform 103 may also perform multiple correlation attempts (cycles), such as according to a configurable time interval. By way of this execution, the other records capable of being correlated beyond those that correlate per the minimum threshold may also be quickly released to the billing systems 106. In the case of the previous example, where 90 of the transport records were correlated to a session record, another correlation determination may be achieved upon processing of the next 90 related transport records. Still further, the minimum threshold value may be automatically set to adjust (downward) for a subsequent correlation attempt, so as to account for those records already correlated as well as to increase the frequency of correlation. Hence, in the previous example, a correlation of 90% may be set to automatically adapt to 88% (decrement by 2%) for the subsequent correlation cycle.

It is noted in this example that all subsequent passes of the correlation process will occur under similar constraints for a configurable wait-time and configurable threshold percentage of correlation. The final correlation pass may be set to a correlation threshold of zero (0), thus allowing all remaining records to correlate regardless of the percentage of correlation. Also of note, in the case of wireless access point (WAP) correlation, the mediation platform 103 may enforce correlation of records that have categorized WAP transport bytes after the correlation step is performed.

In certain embodiments, when a correlation is determined, the mediation platform 103 facilitates generation of a charging detail record (CDR) based on data contained within the correlated records. Generation of the CDR also corresponds to a determination of a chargeable/billable event, thus necessitating the release (transmission) of the CDR to the billing systems 106. The CDR may be generated based on a known internet telephony format, such as IPDR. The mediation platform 103 maps certain data elements contained in the correlated session records and transport record to a data structure for formulating the CDR. Once generated, the platform 103 routes the CDR to the appropriate billing system 106.

In the case where a correlation is not determined, the mediation platform 103 does not generate a CDR. This enables transport records not able to be correlated with a session record to be deemed as non-billable/non-chargeable events. In certain embodiments, the mediation platform 103 may also automatically allow certain records to be passed on to the billing systems 106 as CDRs. This may include, for example, session records that do not generate corresponding transport records, including enterprise subscriber related sessions, code division multiple access (CDMA) roaming in-collect session initiation protocol (SIP) transactions and CDMA in-collect mobile internet protocol (MIP) transactions for international roaming transactions.

It is noted that the mediation platform 103 may be configured in advance of execution of a correlation cycle—i.e., via a system status interface—to correlate on the basis of one or more criterion 107. Also, in future embodiments, it is contemplated the platform 103 may be configured to account for latency or other network conditions. For example, the minimal threshold may be set to be dynamic/dependent on a determined network conditions. As another example, the platform 103 may be set to determine a data record collection latency of X seconds with respect to one of the support systems 102. Under this scenario, when the latency threshold of X seconds is determined, the mediation platform 103 may render a notification message to the service provider for indicating insufficient access to the required record information.

FIG. 1B is a diagram depicting a flow of data through the system of FIG. 1A, according to one embodiment. As shown, the mediation platform 103 serves as an arbitration/mediation component that operates between the support systems 102 and the recipient billing systems to expedite fulfillment of billing and usage data. Hence, a first data flow 141 includes the pulling and subsequent aggregation of the data records from the support systems 102 to the mediation platform 103. Alternatively, the data records may be pushed to the mediation platform 103 in response to a scheduled correlation cycle time period or interval. Certain of the records may be generated according to known computing and data exchange protocols, including the authentication, authorization and accounting (AAA) protocol. Other records may be generated as flow detail records (FDRs), for enabling the associating of data flow statistics with a given record.

The mediation platform 103 processes these data records and then initiates a subsequent data flow 143, which corresponds to transmission of the CDRs generated pursuant to the processing. Also, multiple additional correlation attempts (e.g., re-correlations) may be pursued by the mediation platform 103 periodically, corresponding to data flow 145. As a result of this execution, newly aggregated or previously received data records may be processed according to the minimum correlation threshold while additional records are still aggregated.

It is noted that by way of this data flow, the mediation platform 103 may enable more rapid transmission of billing and usage information to the corresponding billing systems 106. This is in contrast to traditional approaches, wherein the transmission occurs only after full aggregation and correlation of the records is performed. Hence, the mediation platform 103 facilitates expedited movement of business critical billing and usage information by way of the following: (1) enabling generation of corresponding CDRs based a minimal threshold of correlation being attained via at least a subset of the data records; and (2) aggregating (pre-processing) the session records during initiation of the correlation cycle in advance of performing a correlation determination. Still further, the platform 103 enables certain data records to automatically be translated into CDRs based on their characteristics. The following exemplary correlation cycle highlights these features.

In the case of a correlation cycle involving a total of, e.g., 20,000,000 data records—including session and transport records—the records are routed to the mediation platform 103 through the service provider network 109. This corresponds to data flow 141. Per the above described pre-processing execution, the records containing session information may be organized and related to one another without being correlated to any transport records. In this example, a minimal correlation threshold of 80% is established in advance, wherein at least 80% of the aggregated session records must correspond to at least one transport record (e.g., 80:1 ratio).

Under this scenario, a total of 10,000 data records are aggregated over a period of time, of which 8900 are session records and 1100 are transport records. Of the overall session records, 80 are correlated to at least one of the transport records per the correlation criteria 107, for a total of 81 correlated records. While there are additional session records yet to be aggregated from the systems 102 related to the one transport record, the mediation platform 103 is able to determine fulfillment of the minimal threshold of correlation. The mediation platform 103 generates a CDR based on the correlated records according to the IPDR format. This includes, for example, mapping specific data elements contained in the correlated session records and transport records to respective data fields of an IPDR. It is noted that the data mapping procedure may be carried out via any known data transformation or translation means.

Once generated, the CDR is immediately sent downstream to the billing systems 106 (or stored to a database of the billing systems 106), corresponding to data flow 143. Routing of the CDR to the appropriate billing system 106 may be carried out by the mediation platform 103 via a routing and distribution scheme. The above described procedure is then carried out for any subsequent correlating records, thus increasing the rate at which billing and usage data is received by the billing systems 106.

In certain embodiments, the mediation platform 103, support systems 102 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication networks 109-113 may embody or include portions of a signaling system 7 (SS7) network, Internet protocol multimedia subsystem (IMS), or other suitable infrastructure to support control and signaling functions.

FIG. 2 is a diagram of a mediation platform, according to one embodiment. The mediation platform 103 includes executable modules for performing one or more computing, data processing and network based instructions that in combination optimize the rate of delivery of data records required by a billing system associated with a service provider. Such modules can be implemented in hardware, firmware, software, or a combination thereof. By way of example, the mediation platform 103 may include an aggregation module 201, a correlation module 203, a CRD generation module 205, a user interface module 207, a routing module 209 and a communication module 211. In addition, the mediation platform 103 also accesses correlation criteria from a database 107 for enabling the determination of a correlation of records.

In one embodiment, an aggregation module 201 initiates retrieval of data records from the support systems 102. By way of example, the aggregation module 201 may be configured to initiate the retrieval at a specific time interval corresponding to a correlation procedure. The time interval may be configured by way of a system status interface generated by the user interface module 207. In addition, the aggregation module 201 may also maintain a timer for determining a latency of retrieval of data records from the support systems. When it is determined that a period of latency is fulfilled—i.e., one or more data records are not received upon initiation of a collection request—the aggregation module 201 may prompt execution of the user interface module 207 for generating a notification message to the network service provider.

Also, the aggregation module 201 may facilitate retrieval of specific record types in advance of a correlation determination by a correlation module 203. For example, the module 201 may expressly aggregate transport records, including those having shared characteristics, in preparation for a matching of said records with a corresponding session record. This reduces the time required for execution of the correlation as well as the time required for determination of achievement of a minimum correlation threshold.

In certain embodiments, the correlation module 203 determines whether any of the aggregated session records correspond to a plurality of transport records. By way of example, the correlation is performed on the basis of correlation criteria. The correlation criteria 107 may include, for example, a key identifier value (e.g., session identifier or user identifier), timestamp information and other parameters that are common to both sets of records. Hence, the correlation module 203 determines whether any of the transport records contain any such information in common with a session record. In the case of a match, the mediation platform 103 then flags the identified records as being correlated. In the case where there is no match between a given session record and one or more transport records, no flags are set for these records.

It is noted that the correlation module 203 may also invoke the execution of subsequent correlation attempts based on a configured number of times and/or based on a set time interval for re-correlation. In certain instances, the correlation module 203 may restrict non-matching records from the aggregated set in its entirety in instances where repeated correlation attempts for these records fail. For the purpose of illustration, a lack of correlation of certain records may correspond to the determination of non-chargeable/billable events for a given network session.

The correlation module 203 also determines whether a minimal threshold of correlation is determined to be fulfilled. The threshold may represent a percentage of the overall records required to be aggregated for enabling transmission of billing and usage data to the billing systems via the CDR generation module 205. By way of example, the threshold may be determined to be met when the total number of transport records for a given (single) session record are determined to correlate based on the correlation criteria 107. It is noted that the correlation module 203 determines the total number of records expected to correspond to a given session records based on a comparison of the byte counts observed in the assembled transport records as collected for the same session record.

In certain embodiments, the correlation module 203 initiates execution of the charging detail record (CDR) generation module 205 in response to an affirmative correlation determination. This includes an affirmation of the match and/or in response to achievement of the minimum threshold of correlation. By way of example, the module 205 generates a CDR based on an internet protocol detail record format (IPDR). Under this scenario, the module 205 maps specific data elements contained in the correlated session records and transport records to respective data fields of the IPDR. Once generated, the CDR generation module 205 then invokes the routing module 209, which routes the CDR to the appropriate billing systems 106 accordingly.

In one embodiment, a communication module 211 enables formation of a session over a network 109 between the mediation platform 103 and a user device of a network provider. By way of example, the communication module 211 executes protocols and data sharing techniques for enabling the rendering of a system status interface via a browser or web portal application of the network provider.

The above presented modules and components of the mediation platform 103 can be implemented in hardware, firmware, software, or a combination thereof. Though depicted as a separate entity in FIG. 1, it is contemplated that the mediation platform 103 may be implemented for direct operation by network components of the service provider network. As such, the platform 103 may generate direct signal inputs for interacting with the support systems 102 and billing systems 106. In another embodiment, one or more of the modules 201-211 may be implemented for operation by respective components of the service provider network as a platform 103, or combination thereof.

Figure 6:
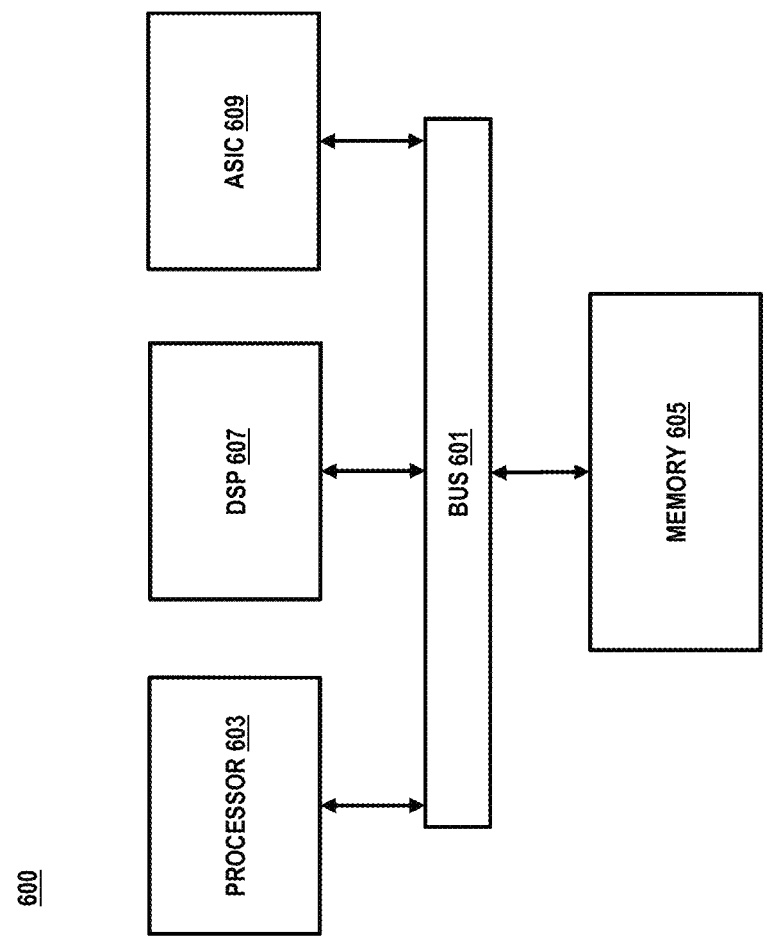
FIG. 6 is a diagram of a chip set that can be used to implement an embodiment of the invention.

FIGS. 3A-3E are flowcharts of processes for optimizing the rate of delivery of data records required by a billing system associated with a service provider, according to various embodiments. In one embodiment, the mediation platform 103 performs processes 300, 308, 312, 316 and 322, which are implemented in, for instance, a chip set including a processor and a memory as shown in FIG. 6.

In step 301, the mediation platform 103 collects session records for specifying data about sessions conducted by network subscribers via the network and transport records for specifying data about the transport of data via the network during a correlation cycle. In another step 303, the platform determines a minimal threshold of correlation between one of the session records and multiple transport records. The determination is based on correlation criteria 107. As noted previously, the correlation criteria 107 may include timing information, an identifier value associated with the session record and the multiple transport records or a number of bytes of data associated with the session record and the multiple transport records.

In step 305, the mediation platform 103 generates a charging data record (CDR) based on a mapping of data associated with the one session record and the multiple transport records. As noted, the mapping may be based on one or more data mapping techniques, wherein various data elements of the records may used to generate the CDR according to an internet protocol detail record (IPDR) format. Per step 307, the platform 103 transmits the charging data record (CDR) to a billing system of the provider prior to the collecting of all the session records and the transport records. By submitting the CDR immediately rather than at the time of full collection of all the records, the billing systems 106 associated with a consumer/network provider may receive necessary billing and usage information.

In step 309 of process 308 (FIG. 3B), the mediation platform 103 analyzes the session records as collected to determine a number of the session records that correspond to a predetermined session type, transaction type, service type or subscriber type. In another step 311, based on the analysis step 309, the platform 103 generates charging data records based on a mapping of data associated with the session records. Of note, the session type, transaction type, service type or subscriber type include an enterprise subscriber, a roaming transaction or an international roaming transaction and the number of session records do not correspond to any of the transport records. By way of this approach, a portion of the collected records may be immediately and automatically processed for use by the billing systems 106.

In step 313 of process 312 (FIG. 3C), the mediation platform 103 determines the collecting of all of the session records and transport records or the transmitting of the charging data record. In another step 315, the platform 103 adapts the minimum threshold of correlation for a subsequent correlation cycle based on the determination. By way of example, the adapting includes increasing or decreasing the minimum threshold of correlation. As noted previously, the threshold may be adapted in response to a subsequent correlation attempt (re-correlation).

In step 317 of process 316 (FIG. 3D), the mediation platform 103 adapts execution of the correlation cycles. The adapting includes increasing or decreasing the number or frequency of the correlation cycles. In another step 319, the platform 103 adapts a frequency or timing of collection of the transport records. As noted previously, the adapting includes increasing or decreasing the frequency or timing of requests for the transport records from the different network elements (e.g., the support systems 102).

Per step 321, the platform 103 determines fulfillment of a network condition, load condition or latency condition associated with the network. The minimal threshold of correlation, an execution of the correlation cycles, or a frequency or timing of collection of the transport records is adapted based on the determination. It is noted that the latency condition may also be related to transmission of the session and/or transport records from the network elements. Under this scenario, the platform 103 may generate a notice for indicating this as an error condition.

In step 323 of process 322 (FIG. 3E), the mediation platform 103 logs the results of the correlation cycle and a subsequent correlation cycle. This includes logging details regarding which session records were correlated with which transport records, the number of overall correlated records, the number of non-correlated records, etc. Per step 325, the platform 103 generates, based on the logged results, a notification message for indicating a status of the minimal threshold of correlation, a status of the correlation cycle or an error condition. As mentioned previously, the notification message may be presented to the network service provider by way of a system status interface generated by the platform 103. It is noted also that other means of notification may be employed, including short messaging service or email messaging.

Figure 4:
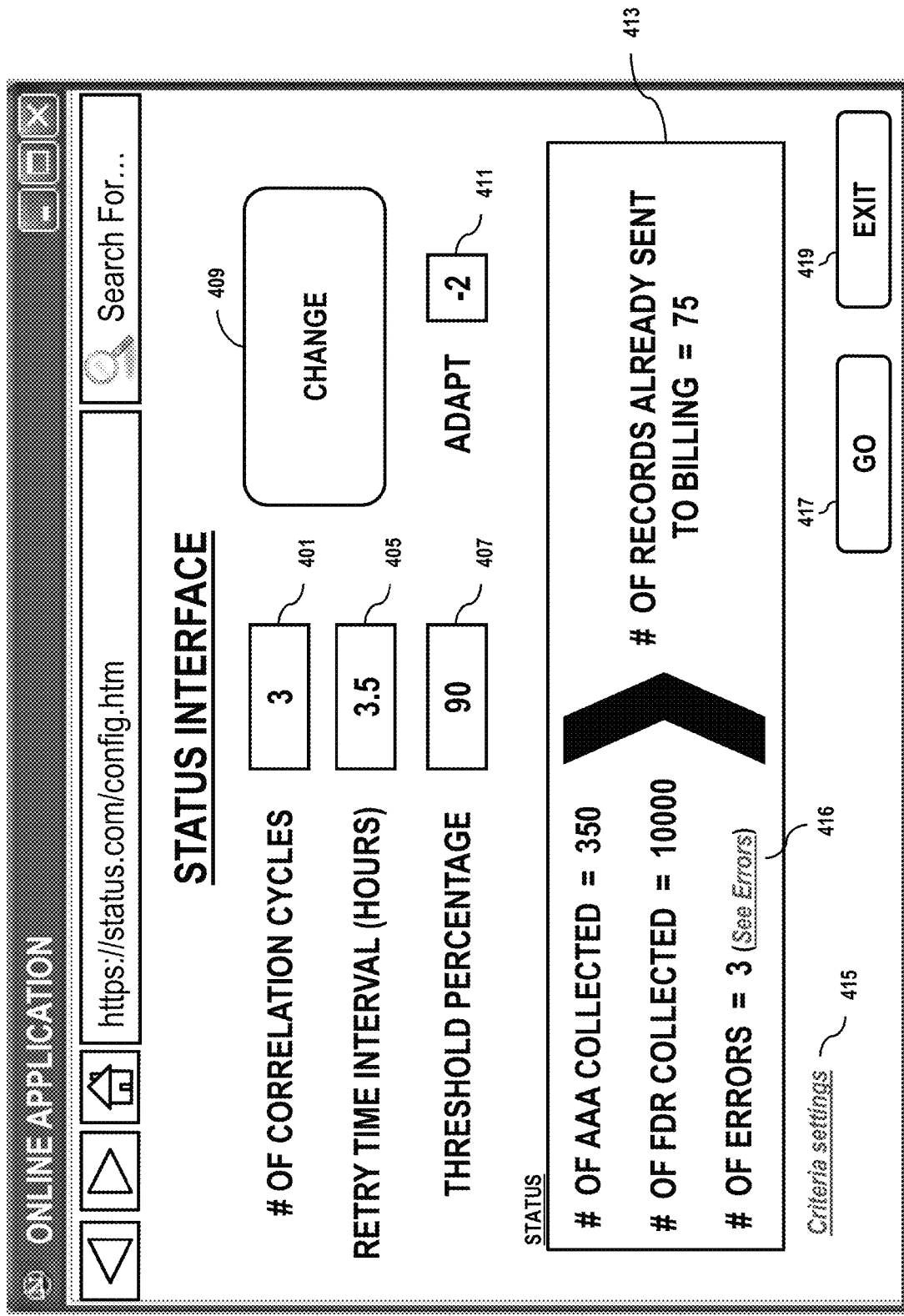
FIG. 4 is a diagram of a user interface for presenting status information to users regarding the delivery of data records required by a billing system, according to one embodiment.

FIG. 4 is a diagram of a user interface for presenting status information to users regarding the delivery of data records required by a billing system, according to one embodiment. For the purpose of illustration, the diagrams are described with respect to an exemplary use case of a system status interface 400 as presented via a browser application. The system status interface 400 enables a network operator to monitor the status of a current correlation procedure (in execution) as facilitated by the mediation platform 103. In addition, the system status interface 400 also presents different controls for enabling the network operator to adapt the execution of the correlation procedure.

In FIG. 4, the interface 400 presents fields for indicating a current number of correlation cycles (field 401), a correlation retry time interval (re-correlation) (field 405), a minimum correlation threshold value (field 407) and a threshold adaptation value (field 411). The user is also presented with a CHANGE action button 409 for enabling the network operator to modify any of the values presented in the fields 401, 405, 407 and 411. By way of example, the operator may select the CHANGE action button 409, causing the fields to be unrestricted for data entry. The user may then alter a value represented in the corresponding field—i.e., change the minimum threshold value from, e.g., 90% to 88%. It is noted that in the case of a current correlation cycle being executed, any changes made may be delayed until completion of the current correlation cycle.

Also presented is a status log 413, which presents data and statistics regarding the execution of the current correlation cycle. In this example, the information presented includes a current number of session records (AAA) collected, a current number of transport records (FDR) and a current number of error determinations. In the case of the errors, this may correspond to the number of times a latency condition was determined with respect to the retrieval of one or more data records. The user may select a corresponding "See Errors" link 416 for enabling presentment of an error log file that provides the network operator with more detail regarding the errors.

Also presented to the status log is information for indicating a number of charge detail records (CDRs) that have been routed to the billing systems by the mediation platform 103. This value is based on the number of records determined to be correlated, and specifically, corresponds to at least the number of session records that have been determined to correlate with the multiple transport records collected during the correlation cycle.

The interface 400 also presents a "Criteria Settings" link 415, which upon selection invokes a window for permitting the network operator to adapt the correlation criteria. For example, the user may be presented with an option to adapt the criteria to a time based correlation scheme, an identifier based correlation scheme, or a combination thereof. Also presented may be file selection option for enabling the operator to select a particular data file for indicating specific criteria 107. Once a change has been entered, the network operator may select the GO action button 417 or EXIT action button 419 to accept or reject the changes respectively.

The exemplary techniques and systems presented herein enable a means for optimizing the rate of delivery of data records required by a billing system associated with a service provider. The system includes a mediation platform 103, which operates in connection with a service provider network to offer various advantages. As one advantage, the platform 103 supports early correlation of business critical records to promote the release/transmission of said records to downstream consumer and/or network provider billing systems incrementally. As another advantage, the system supports multiple correlation attempts, which enables only the items which have not only been partially or have not been previously correlated to be subject to another correlation determination.

The processes described herein for optimizing the rate of delivery of data records required by a billing system associated with a service provider may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
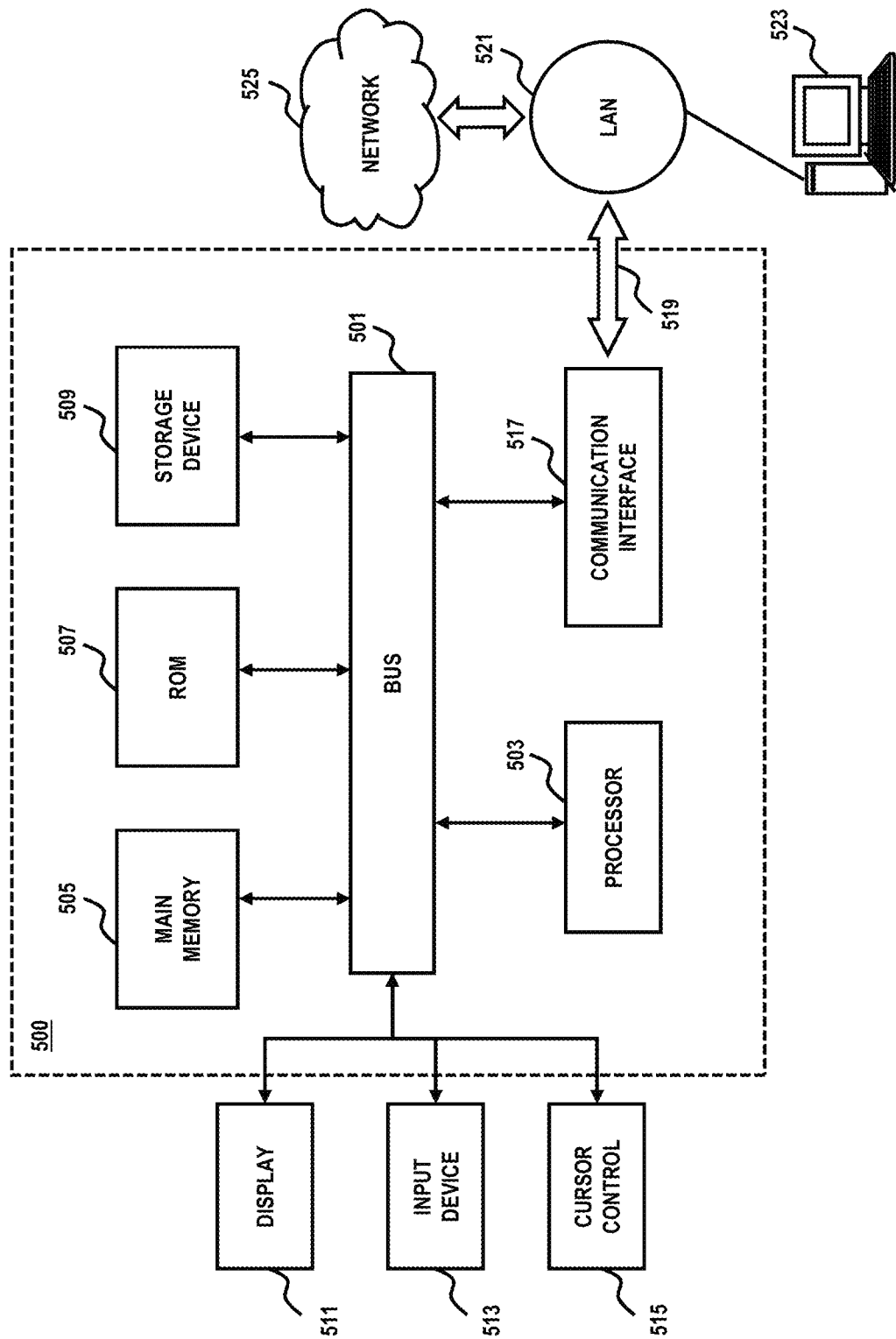
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 4, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to optimize the rate of delivery of data records required by a billing system associated with a service provider as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of optimizing the rate of delivery of data records required by a billing system associated with a service provider.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to optimize the rate of delivery of data records required by a billing system associated with a service provider. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
collecting, from different network elements associated with a network of a provider, session records for specifying data about sessions conducted by network subscribers via the network and transport records for specifying data about the transport of data via the network during a correlation cycle;
determining, based on correlation criteria, a minimal threshold of correlation between one of the session records and multiple transport records;
generating, based on the minimal threshold of correlation, a charging data record based on a mapping of data associated with the one session record and the multiple transport records; and
transmitting the charging data record to a billing system of the provider prior to the collecting of all of the session records and transport records.

2. A method of claim 1, further comprising:
analyzing the session records as collected to determine a number of the session records that correspond to a predetermined session type, transaction type, service type or subscriber type; and
generating, based on the analysis, charging data records based on a mapping of data associated with the session records.

3. A method of claim 2, wherein the session type, transaction type, service type or subscriber type include an enterprise subscriber, a roaming transaction or an international roaming transaction and the number of session records do not correspond to any of the transport records.

4. A method of claim 1, further comprising:
determining the collecting of all of the session records and transport records or the transmitting of the charging data record; and
adapting the minimum threshold of correlation for a subsequent correlation cycle based on the determination, wherein the adapting includes increasing or decreasing the minimum threshold of correlation.

5. A method of claim 1, further comprising:
adapting execution of the correlation cycle, wherein the adapting includes increasing or decreasing the number or frequency of the correlation cycles.

6. A method of claim 1, further comprising:
adapting a frequency or timing of collection of the transport records, wherein the adapting includes increasing or decreasing the frequency or timing of requests for the transport records from the different network elements.

7. A method of claim 1, further comprising:
logging the results of the correlation cycle and a subsequent correlation cycle; and
generating, based on the logged results, a notification message for indicating a status of the minimal threshold of correlation, a status of the correlation cycle or an error condition.

8. A method of claim 1, further comprising:
determining fulfillment of a network condition, load condition or latency condition associated with the network, wherein the minimal threshold of correlation, an execution of the correlation cycles, or a frequency or timing of collection of the transport records is adapted based on the determination.

9. A method of claim 1, wherein the correlation criteria includes timing information, an identifier value associated with the session record and the multiple transport records or a number of bytes of data associated with the session record and the multiple transport records.

10. A method of claim 1, wherein the different network elements are business support systems or operations support systems.

11. An apparatus comprising:
at least one processor; and
at least one memory including computer program code for one or more programs,
the at least one memory and the computer program code configured to, with the at least one processor, cause the apparatus to perform at least the following,
collect, from different network elements associated with a network of a provider, session records for specifying data about sessions conducted by network subscribers via the network and transport records for specifying data about the transport of data via the network during a correlation cycle;
determine, based on correlation criteria, a minimal threshold of correlation between one of the session records and multiple transport records;
generate, based on the minimal threshold of correlation, a charging data record based on a mapping of data associated with the one session record and the multiple transport records; and transmit the charging data record to a billing system of the provider prior to the collecting of all of the session records and transport records.

12. An apparatus of claim 11, wherein the apparatus is further caused to:

analyze the session records as collected to determine a number of the session records that correspond to a predetermined session type, transaction type, service type or subscriber type; and generate, based on the analysis, charging data records based on a mapping of data associated with the session records.

13. An apparatus of claim 12, wherein the session type, transaction type, service type or subscriber type include an enterprise subscriber, a roaming transaction or an international roaming transaction and the number of session records do not correspond to any of the transport records.

14. An apparatus of claim 1, wherein the apparatus is further caused to:

determine the collecting of all of the session records and transport records or the transmitting of the charging data record; and adapt the minimum threshold of correlation for a subsequent correlation cycle based on the determination, wherein the adapting includes increasing or decreasing the minimum threshold of correlation.

15. An apparatus of claim 11, wherein the apparatus is further caused to:

adapt execution of the correlation cycle, wherein the adapting includes increasing or decreasing the number or frequency of the correlation cycles.

16. An apparatus of claim 11, wherein the apparatus is further caused to:

adapt a frequency or timing of collection of the transport records, wherein the adapting includes increasing or decreasing the frequency or timing of requests for the transport records from the different network elements.

17. An apparatus of claim 11, wherein the apparatus is further caused to:

log the results of the correlation cycle and a subsequent correlation cycle; and generate, based on the logged results, a notification message for indicating a status of the minimal threshold of correlation, a status of the correlation cycle or an error condition.

18. An apparatus of claim 11, wherein the apparatus is further caused to:

determine fulfillment of a network condition, load condition or latency condition associated with the network, wherein the minimal threshold of correlation, an execution of the correlation cycles, or a frequency or timing of collection of the transport records is adapted based on the determination.

19. An apparatus of claim 11, wherein the correlation criteria includes timing information, an identifier value associated with the session record and the multiple transport records or a number of bytes of data associated with the session record and the multiple transport records.

20. An apparatus of claim 11, wherein the different network elements are business support systems or operations support systems.

* * * * *